US008078205B2

(12) United States Patent
James

(10) Patent No.: US 8,078,205 B2
(45) Date of Patent: Dec. 13, 2011

(54) METHOD AND SYSTEM FOR SHARING AND STORING DIGITAL INFORMATION IN MOBILE DEVICES

(75) Inventor: Chris James, New York, NY (US)

(73) Assignee: Snapdat Networks, Inc., New York, NY (US)

( * ) Notice: Subject to any disclaimer, the term of this patent is extended or adjusted under 35 U.S.C. 154(b) by 349 days.

(21) Appl. No.: 12/457,880

(22) Filed: Jun. 24, 2009

(65) Prior Publication Data

US 2010/0009702 A1 Jan. 14, 2010

Related U.S. Application Data

(60) Provisional application No. 61/129,400, filed on Jun. 24, 2008.

(51) Int. Cl.
*H04W 4/12* (2009.01)
(52) U.S. Cl. ............... 455/466; 455/456.1; 709/206
(58) Field of Classification Search ............. 455/466, 455/456; 709/201–207; 707/736–767
See application file for complete search history.

(56) References Cited

U.S. PATENT DOCUMENTS

| | | | | |
|---|---|---|---|---|
| 2002/0151326 | A1* | 10/2002 | Awada et al. ............ | 455/556 |
| 2003/0084180 | A1* | 5/2003 | Azami ................... | 709/231 |
| 2006/0293903 | A1* | 12/2006 | Ramanathan et al. ......... | 705/1 |
| 2006/0293904 | A1* | 12/2006 | Ramanathan et al. ......... | 705/1 |
| 2007/0192352 | A1* | 8/2007 | Levy ..................... | 707/102 |
| 2010/0235376 | A1* | 9/2010 | Sukanen et al. ........... | 707/769 |

* cited by examiner

*Primary Examiner* — Kent Chang
*Assistant Examiner* — Kashif Siddiqui
(74) *Attorney, Agent, or Firm* — Andrews Kurth LLP

(57) ABSTRACT

A method and system for sharing digital information, including biographical information is described. A method for sharing biographical information on mobile telecommunication device that includes providing an application for sharing bio-cards on a mobile telecommunication device, receiving inputs including biographical information, one or more selected bio-card layouts and one or more bio-card graphics, creating one or more bio-cards based on the received inputs, and retrieving potential bio-card recipients. The mobile telecommunication device includes a processor and a memory and bio-cards are digital representations of biographical information about a user that may be displayed on the mobile telecommunication device. The potential bio-card recipients include mobile telecommunication devices. The method further includes displaying the created one or more bio-cards, receiving a selection of one or more recipients to receive a bio-card; receiving a selection of a bio-card to send to the selected one or more recipients; and transmitting the selected bio-card to the one or more selected recipients.

19 Claims, 11 Drawing Sheets

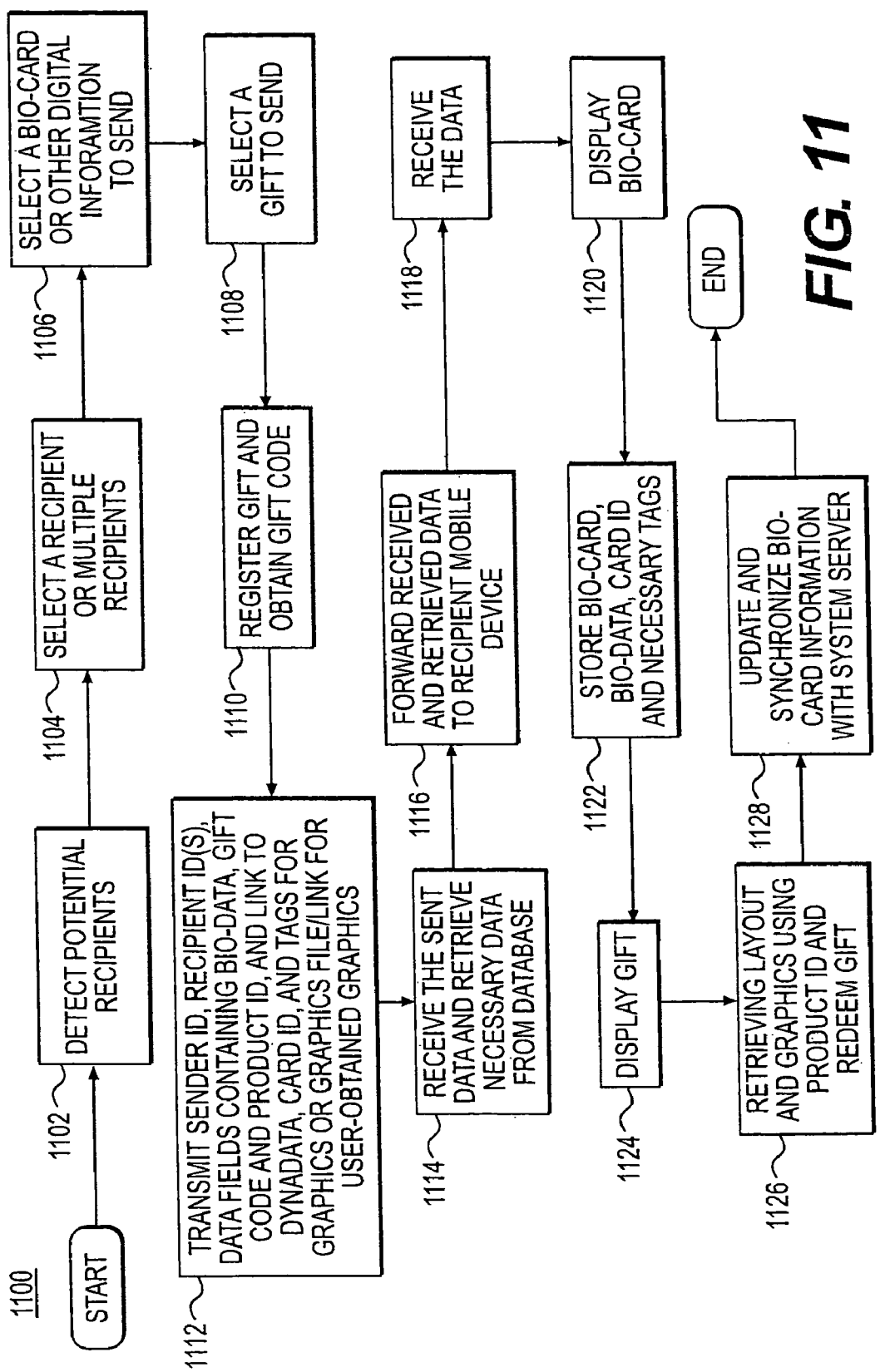

METHOD AND SYSTEM FOR SHARING AND STORING DIGITAL INFORMATION IN MOBILE DEVICES

CROSS-REFERENCE TO RELATED APPLICATIONS

This application claims priority of U.S. Provisional Application Ser. No. 61/129,400, filed Jun. 24, 2008 which is hereby incorporated by reference in its entirety.

BACKGROUND

Present methods and mechanisms for passing contact information are slow and inefficient. They involve exchanging business cards or writing down such information. In today's world with the ubiquitous mobile phone and other mobile communication devices, manually passing contact information is archaic. Unfortunately, the existing methods for passing contact information or other digital information from mobile device to mobile device are lacking. For example, Bluetooth information passing is hardware based, requires Bluetooth to be running on both phones, and is currently plagued by a painfully inefficient, cumbersome and time-consuming "pairing" requirement. Likewise, infrared information passing, which preceded Bluetooth, is also hardware based, not supported by many current phones, and is plagued by poor reliability and direct line of sight issues (local only). Additionally, vCards, sent via MMS or e-mail, while software based, simply provide a textual file format that is not flexible or user friendly and that lacks advanced features and graphical interface. None of these methods have been widely adopted.

SUMMARY

Embodiments described herein provide numerous advantages over the prior art, including those described herein. These advantages may be provided by, for example, a method for sharing biographical information on mobile telecommunication devices. The method includes providing an application for sharing bio-cards on a mobile telecommunication device, receiving inputs including biographical information, one or more selected bio-card layouts and one or more bio-card graphics, creating one or more bio-cards based on the received inputs, and retrieving potential bio-card recipients. The mobile telecommunication device includes a processor and a memory and bio-cards are digital representations of biographical information about a user that may be displayed on the mobile telecommunication device. The potential bio-card recipients include mobile telecommunication devices. The method further includes displaying the created one or more bio-cards, receiving a selection of one or more recipients to receive a bio-card; receiving a selection of a bio-card to send to the selected one or more recipients; and transmitting the selected bio-card to the one or more selected recipients. The transmitting the selected bio-card comprises retrieving the biographical information, a card ID corresponding to the bio-card layout, a tag corresponding to the bio-card graphics, and a recipient ID and sending a sender ID, the biographical information, card ID, tag and recipient ID. The one or more selected recipients include stored bio-card layouts and bio-card graphics that are retrieved using the card ID and tag.

These and other advantages may also be provided by a computer readable medium containing instructions for sharing biographical information on mobile telecommunication devices. The instructions include instructions for receiving inputs including biographical information, one or more selected bio-card layouts and one or more bio-card graphics. The bio-cards are digital representations of biographical information about a user that may be displayed on the mobile telecommunication device. The instructions further include instructions for creating one or more bio-cards based on the received inputs utilizing a processor, retrieving potential bio-card recipients, displaying the created one or more bio-cards, receiving a selection of one or more recipients to receive a bio-card; receiving a selection of a bio-card to send to the selected one or more recipients; and transmitting the selected bio-card to the one or more selected recipients. The potential bio-card recipients include mobile telecommunication devices and the transmitting the selected bio-card comprises retrieving the biographical information, a card ID corresponding to the bio-card layout, a tag corresponding to the bio-card graphics, and a recipient ID and sending a sender ID, the biographical information, card ID, tag and recipient ID. The one or more selected recipients include stored bio-card layouts and bio-card graphics that are retrieved using the card ID and tag.

These and other advantages may also be provided by a system for sharing biographical information on mobile telecommunication devices. The system includes a server, a database associated with the server, and a mobile telecommunications device, connected to the server via a telecommunications network, that includes a processor and a memory, the memory including instructions, executed by the processor, for sharing bio-cards. The bio-cards are digital representations of biographical information about a user that may be displayed on the mobile telecommunication device and the instructions including instructions for receiving inputs including biographical information, one or more selected bio-card layouts and one or more bio-card graphics, creating one or more bio-cards based on the received inputs utilizing the processor, retrieving potential bio-card recipients, displaying the created one or more bio-cards, receiving a selection of one or more recipients to receive a bio-card; receiving a selection of a bio-card to send to the selected one or more recipients; and transmitting the selected bio-card to the one or more selected recipients. The transmitting the selected bio-card comprises retrieving the biographical information, a card ID corresponding to the bio-card layout, a tag corresponding to the bio-card graphics, and a recipient ID and sending a sender ID, the biographical information, card ID, tag and recipient ID. The one or more selected recipients include stored bio-card layouts and bio-card graphics that are retrieved using the card ID and tag.

BRIEF DESCRIPTION OF THE FIGURES

The detailed description will refer to the following drawings, wherein like numerals refer to like elements, and wherein:

FIG. 11 is a flowchart illustrating an embodiment of a method of sending bio-data (e.g., Bio-cards) using embodiments of a method and system for sharing and storing digital information in mobile devices.

DETAILED DESCRIPTION

Figure 1:
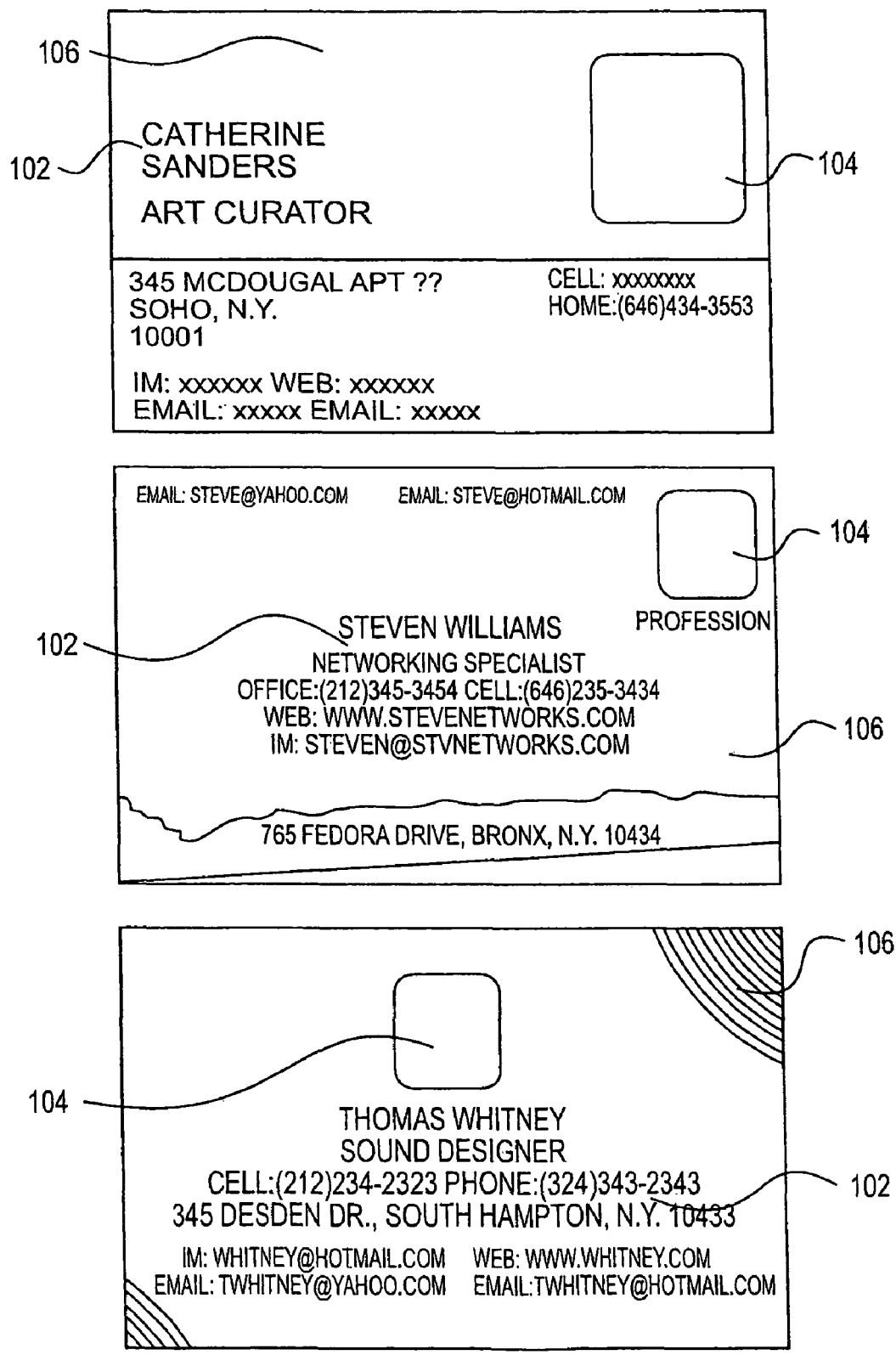
FIG. 1 is a drawing illustrating an embodiment of a graphical interface for sharing biographical information, or a Bio-card, provided by embodiments of a method and system for sharing and storing digital information in mobile devices.

Described herein are a method and system for sharing and storing digital information in mobile devices. An embodiment of the method and system share and store contact data within the context of a "mobile device" to "mobile device" interaction ("M2M"). Mobile device as used herein is a mobile telecommunication device capable of transmitting and receiving data, including voice, text, multimedia and other data as described herein, from and to a telecommunications network. This embodiment sends and receives contact data using a unique graphical interface that offers significant advantages over the prior art. However, it is important to note that the method and system extend to virtually any type of information that can be represented digitally.

Embodiments of the system and method provide a unique, graphical interface to enable and effect an improved and simplified transmission of biographical information ("bio-data") (or other digital data) from one mobile device to another mobile device. This embodiment works on a cross-platform basis. In an implementation, this embodiment provides a M2M bio data exchange using a graphical, business card-like format. Other implementations may exchange data as a profile page, such as, e.g., a MySpace™ or Facebook™ profile page. Another embodiment enables digital "zoning" of space in the graphical interface (e.g., such as on the digital business card or profile page) used to convey bio-data (or other digital data) into a combination of zones. In an embodiment, the zones include a static zone, in which the information rarely, if ever, changes, a slowly-changing zone, in which the information changes infrequently, and a dynamic zone, in which the information is constantly and dynamically updated to provide relevant, timely information. An implementation of this embodiment refers to the dynamic zone as "Dyna-Data" and it may include dynamically served multimedia content such as videos, audio and slide-shows. Yet another embodiment utilizes the unique, graphical, bio-data-based interface to provide a graphics-rich, contact-based, dynamic, mobile digital marketplace in which people are instantly matched with products, services or virtually any digital asset, as described below. Such a digital marketplace enables users to, e.g., choose recipient(s), choose a product/service/digital file (e.g., a coupon or certificate, a purchase voucher, a photo, a video, resume, etc.) (the "gift"), send the gift instantly to the chosen recipient, who receives the gift instantly and may redeem the gift instantly to acquire the product or service. All of this may be done M2M.

Embodiments of the system and method described herein provide a highly interactive interface that includes rich graphics and design. The interface extends the familiar concept of a business card to the digital, mobile phone or mobile device platform. Embodiments utilize a simple, intuitive send and receive process and efficient data flow architecture, utilizing a client-centric approach. The system and method provide a server and client networking option.

With reference now to FIG. 1, shown is a screen shot of three examples of a graphical interface 100 for sharing digital information 102 M2M. The digital information here is biographical information 102, e.g., contact information. The graphical interface 100 here is a digital business card (a "Bio-Card"), although the graphical interface 100 may be configured as a profile page or other presentation of biographical, or other digital, information. The Bio-Card 100 shown allows users to present, share and store biographical data 102 in a fully graphical context, mimicking and enhancing familiar concept of the traditional business card. The biographical information 102 in each Bio-Card 100 may include one or more photographs 104 of the user to whom the Bio-Card 100 pertains.

Bio-Cards 100 are a distinct departure from plain vCard attachments or Text-Based Phone PIM approaches. Bio-Card 100 are customizable by the user. Using an application loaded on the user's mobile device (e.g., the "SnapDat" application), the system and method offer a wide array of background art, multimedia images, fonts, colors, styles, text effects and layouts (collectively, "graphics") 106 for Bio-Card 100. The application may be client software running on the mobile device. The application may interact with a system server in a client-server or other architecture. Embodiments described herein enable users to further customize their Bio-Card(s) 100, customizing the design and embedding larger data files. The data files may include, for example, resumes, photo-slide shows, work product examples, etc.

Embodiments of the system and method provide a client-centric approach for providing users an application that enables the creation, storing and sharing of graphical interfaces described herein such as Bio-Card 100 illustrated in FIG. 1. This client-centric approach enables users to do practically everything necessary for the sharing and storing of digital information, here biographical information, on and from their mobile device. Users can download and install the application and other software and updates, register, create, edit, send, share, and store, e.g., their Bio-Card(s) 100, using their mobile phone. With the application described herein, users can also receive and store Bio-Cards 100 that they receive from other users. In embodiments described herein, syncing to a computer or website is generally not required. Specifically, in embodiments described herein, the application will interact with the server to affect the transfer of a Bio-Card 100. However, in these embodiments the application is not a "syncing" application that merely updates from a web-site (such as, e.g., Linked-In™) or CPU PIM (such as, e.g., MS Outlook). Rather, the application transfers new information from point A (a first mobile phone or device) to point B (a second mobile phone or device) in a M2M fashion.

Moreover, an efficient data flow architecture enables the system and method to send and receive digital data (e.g., biographical data) quickly and securely. In embodiments described herein, only data fields (e.g., XML data fields), lookup tags and unique profile images are actually sent through the "pipe" (i.e., the communications path between mobile devices). In these embodiments, all the initials background art, etc., is stored locally on the mobile device upon installation of the application. When a Bio-Card 100 is "sent," instead of sending the card design graphics 106, the system and method simply send the tags for the design. The application on the recipient mobile device recognizes the graphics 106 from the tags and "re-creates" the graphical interface on the recipient mobile device. In other embodiments, Bio-Cards 100 or other data may be stored and also presented directly via the server structure. Once a Bio-Card 100 is created and pushed "up" to the server, only the lookup ID and other simple text fields (e.g., with the look-up tags) will need to be sent over the pipe to affect Bio-Card transfer. This further reduces data traffic on the pipe, increasing the speed of the data transfer.

Upon receipt of the Bio-Card 100, the application seamlessly adds or updates the biographical data contained on the Bio-Card 100 to the recipient's native mobile device contact database. No manual re-entry of the data is necessary. This offers a significant and substantial improvement over current contact information sharing.

Once a Bio-Card 100 is created, the system and method provide a simple, quick workflow for sending the Bio-Card 100 to another mobile device. In an embodiment, a user launches the application, selects a Bio-Card 100 (e.g., from a collection of Bio-Cards 100 prepared and profiled for different purposes—business, personal, etc.), enters a recipient ID (a "SnapID") and clicks Send. This simple, quick process is a drastic improvement over current manners of transmitting contact information. The application may be configured to launch when a corresponding icon is selected on the mobile device screen.

Figure 2:
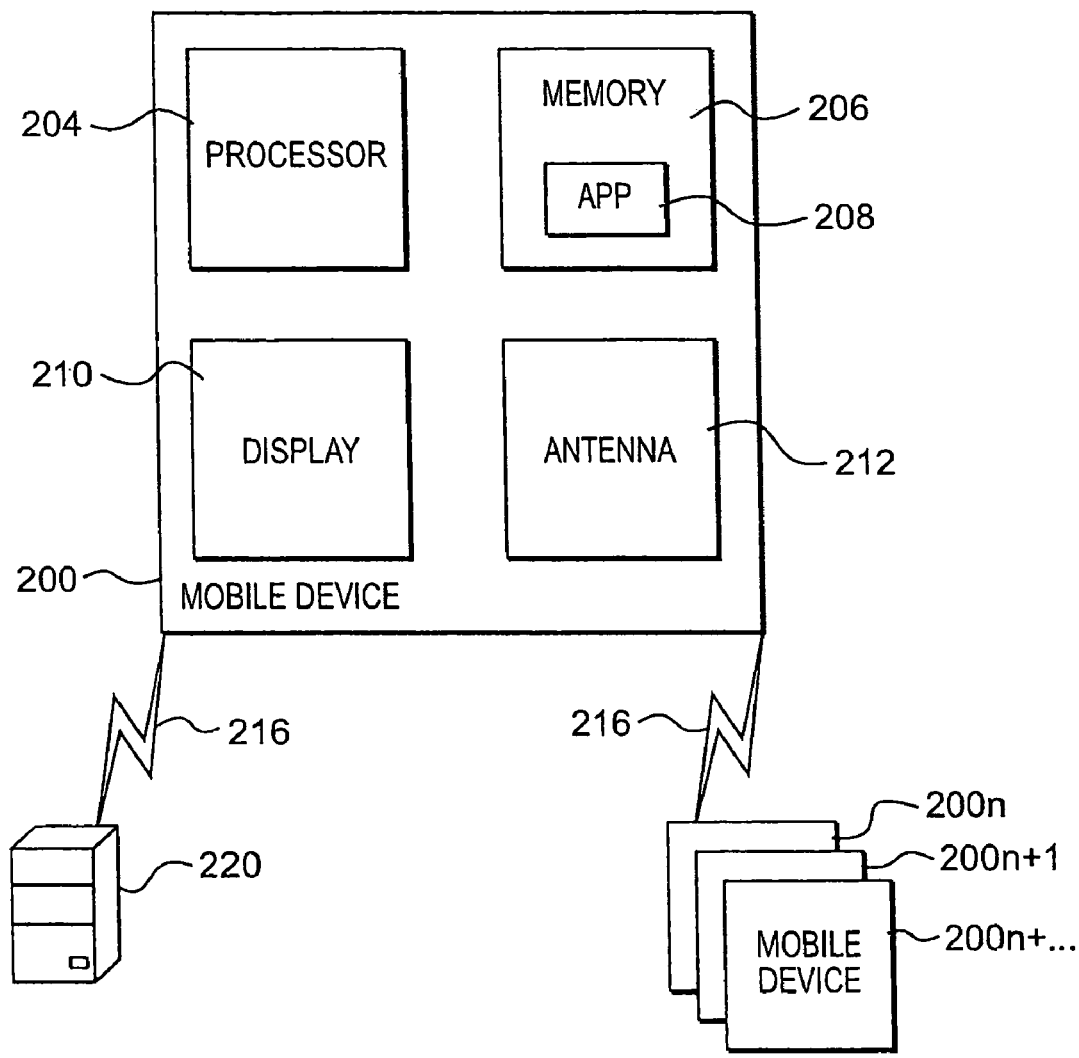
FIG. 2 is a block diagram illustrating an embodiment of a system for sharing and storing digital information (e.g., bio-data) in mobile devices.

With reference now to FIG. 2, shown is a diagram illustrating an embodiment of system 20 for sharing and storing digital information, e.g., bio-data, in mobile devices. System 20 includes mobile devices 200, 200n, 200n+1 . . . , with application 206 running thereon. Mobile device 200 may be a variety of mobile devices such as an iPhone™, Blackberry™, or similarly capable mobile device. Mobile device 200 includes processor 204, memory 206, on which application 208 is loaded, display 210 and antenna 212 or other similar component for connecting to telecommunications networks 216. Application 208 includes instructions for performing methods and processes described herein. Memory 206 may be SIM card, built-in memory or other computer-readable storage medium on mobile device 200, as is understood to those of skill in the art. Processor 204 runs application 208, executing instructions in application 208 to perform methods and processes described herein. Mobile device 200 connects to other similar mobile devices 200n, 200n+1 . . . , and system server 220 via telecommunications networks 216. Telecommunications network 216 may include Internet or otherwise provide connection to the Internet. Server 220 may include database for storing Bio-Card information, data for supporting application 208 and other data otherwise associated with system and method for sharing and storing digital information, as described herein.

Figure 3:
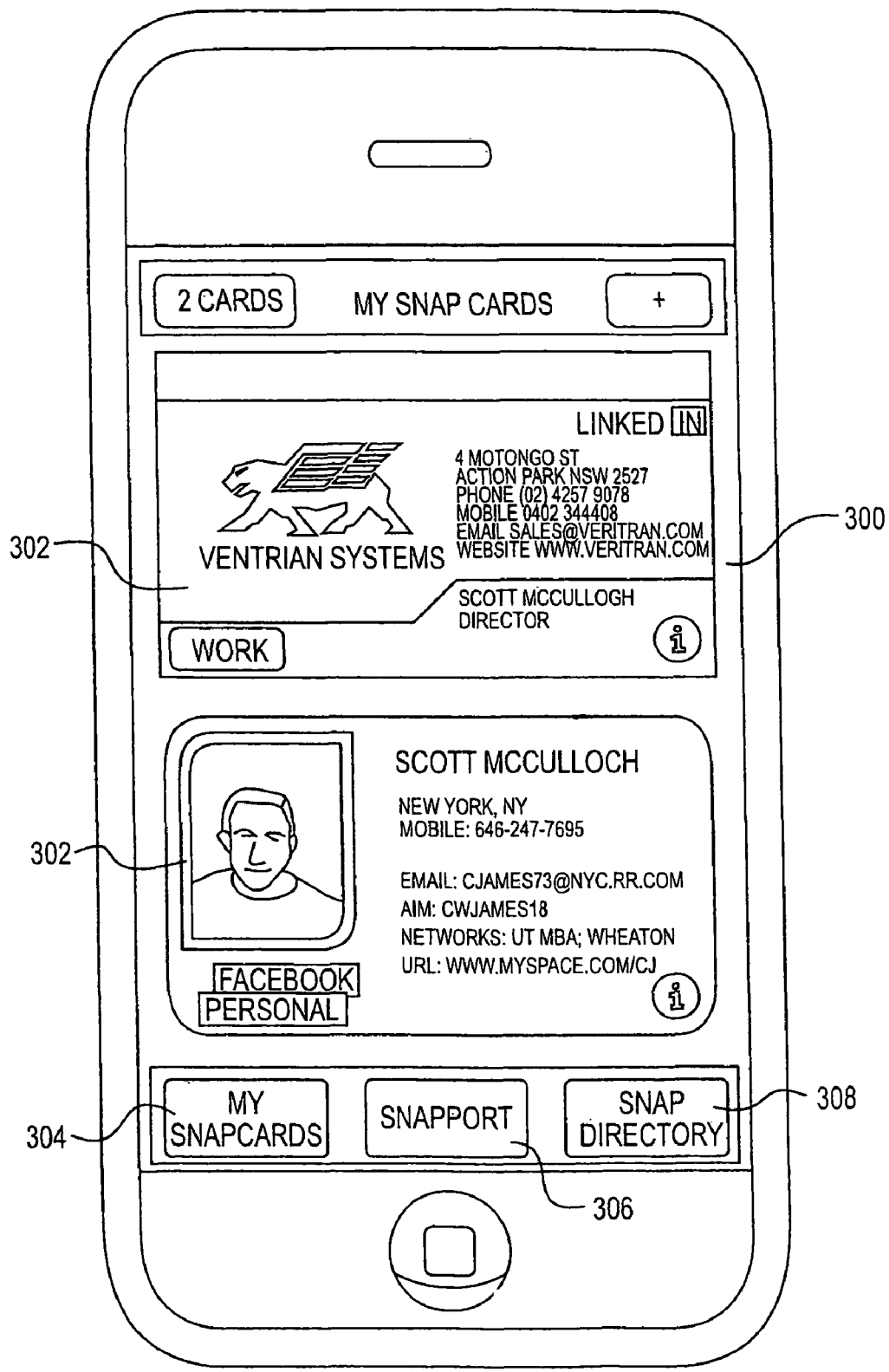
FIG. 3 is a drawing illustrating an embodiment of a graphical user interface for sharing biographical information provided by embodiments of a method and system for sharing and storing digital information in mobile devices.

In an embodiment, application 200 defaults to a Bio-Card selection screen upon launch of application 200. With reference now to FIG. 3, shown is a screen shot of an exemplary Bio-Card selection screen 300 provided by embodiments of the system and method described herein. Bio-Card selection screen 300 displays a user's profiled Bio-Cards 302. In embodiments, Bio-Card selection screen 300 is home screen of application 200. On Bio-Card selection screen 300, the user can select a Bio-Card 302 (e.g., by touching displayed card using touch screen interface), enter a recipient's unique identifier within the system, which may be known as a SnapID and click Send to quickly transmit the selected Bio-Card 302 to a recipient's mobile device. Likewise, from Bio-Card selection screen 300, a user can select and edit a Bio-Card 302.

Bio-Card selection screen 300 may also include sections or "buttons" that maybe selected to access other screens and functionality of application 200. For example, a Bio-Card (e.g., named "My SnapCards" or similarly named) button 304 may be used to access Bio-Card selection screen 300. A "SnapPort" or similarly named button 306 may also be used to access the Bio-Card selection screen 300. The SnapPort is designed to receive Bio-Cards (i.e., SnapCards) that have been sent from other users. The SnapPort acts as a staging area where the user can save or delete incoming BioCards. If saved, they are permanently stored on the user's mobile device. A directory (e.g., "Snap Directory") button may be used to access a view or directory screen that provides a directory listing or other view of a user's stored Bio-Card contacts (i.e., Bio-Cards of other users that user has stored on mobile device). Other buttons may be provided on Bio-Card selection screen 300 or other screens of application 200.

In an embodiment, application 200 may automatically sense the recipient users with which the user may want to share biographical data. The system and method may accomplish the sensing through "always-on" networking technology. In other words, a mobile device with application 200 loaded may sense other mobile devices with application 200 loaded. This may be accomplished by application 200, e.g., utilizing "always-on" networking functionality of the mobile device on which it runs. For example, if the mobile device is an iPhone 2.0, the OS function Bonjour™ provides a serverless, always-on client networking functionality. Other mobile devices, such as Blackberry, may have different always-on technology. In any case, the application leverages this always-on technology. For example, using bonjour, the iPhone will find other iPhones on the same WiFi network via bonjour. Application 200 may connect with the "found" iPhones via bonjour and presents the found iPhones as "candidate recipients" to the application user. Other always-on networking technologies would be utilized by the application in the same or in a similar manner. Application 200 may then populate a send screen (described below), or other screen, with the list of the connected application-enabled mobile device users. The list may include photos of the users. The user may then select a Bio-Card and a user or users from the list to send the Bio-Card. In this example, the method may include the following steps: launch application, select Bio-Card and select found iPhone corresponding to the person with whom to exchange information. If the person's mobile device is not shown, user would toggle to SnapID method described below.

Figure 4:
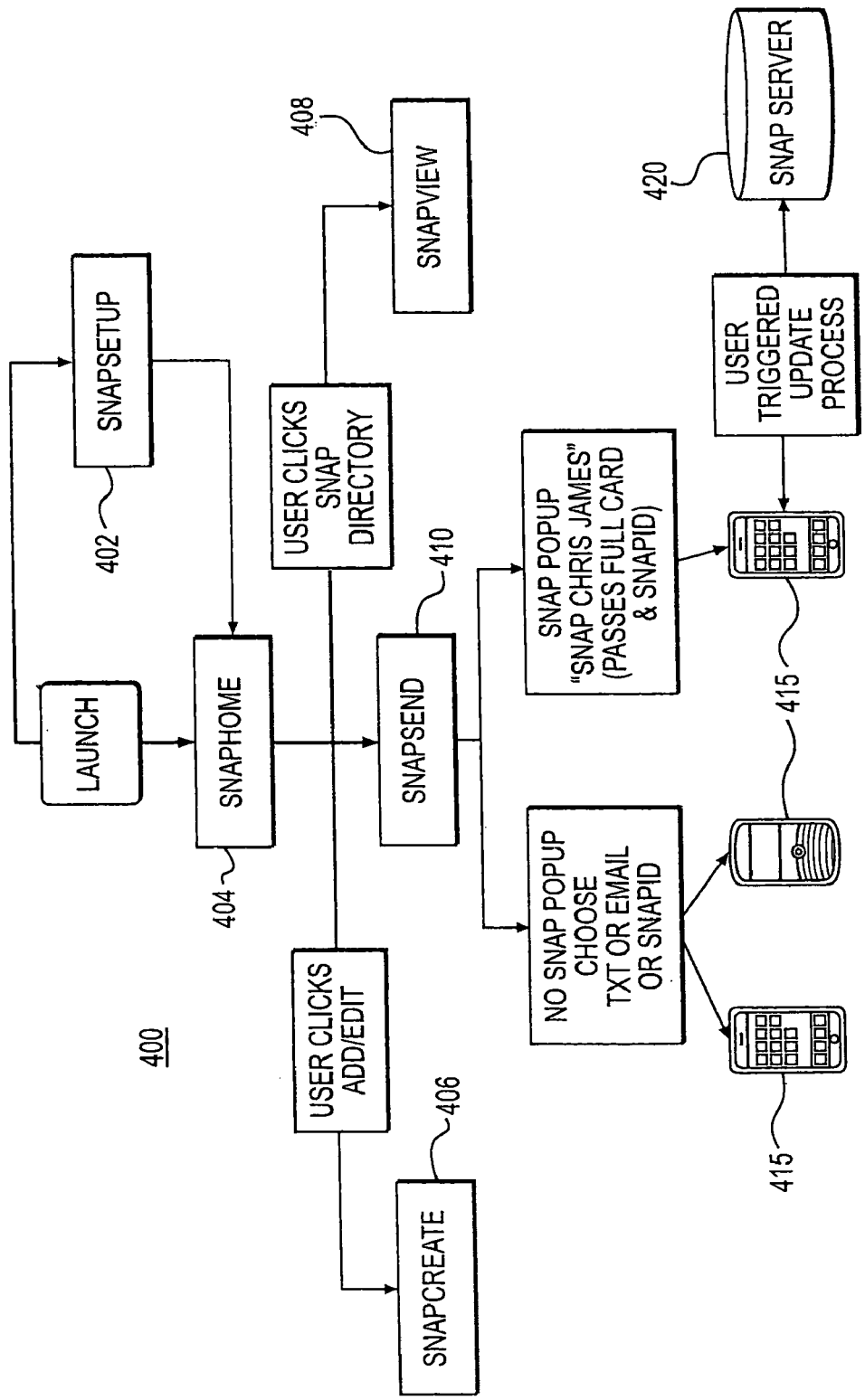
FIG. 4 is a diagram illustrating screens of an embodiment of an application for sharing biographical information provided by embodiments of a method and system for sharing and storing digital information in mobile devices.

With reference now to FIG. 4, shown is a screen map illustrating screens of application 400 of an embodiment of the system and method. The application screen map illustrates screens, processes and elements of application 400 architecture. The map illustrates a setup screen 402 that application 400 may display on the user's mobile device when application 400 is first installed. The setup screen 402 assists the user to set-up their SnapID, prompts the user to enter basic information (e.g., user's bio-data), creates an initial Bio-Card based on the user's inputs and may display a brief tutorial. The setup screen 402 is typically only displayed one time when application 400 is installed. However, setup screen 402 may be re-displayed, for example, if user wants to edit setup selection, or if application 400 update is loaded.

In an embodiment, a home screen 404 is displayed whenever the application is launched. The home screen 404 may be the Bio-Card selection screen 300 shown in FIG. 3. Typically, home screen 404 invites user to select a Bio-Card. A create screen 406 may be accessed from the home screen 402 when the user selects a Bio-Card and clicks on or otherwise selects add or edit options on the home screen 402 or other screen. The create screen 406 is used to create or edit Bio-Cards. The user may select to choose data from the user's bio-data entered or imported from the mobile devices' native address book on the setup screen, apply a card design (e.g., selecting graphics for the Bio-Card) and name and save the Bio-Card. The create screen 406 may include tabs corresponding to each of these functions, providing a different sub-screen under each tab. A view 408 displays a list or directory view of the Bio-Cards that the user has received from other users. View screen 408 may be displayed when user selects directory button 308 shown in FIG. 3. If the user selects an individual card to view on the view screen 408, the view screen 408 will display the selected Bio-Card.

With continuing reference to FIG. 4, a send screen 410 may be displayed when the user selects a Bio-Card for sending. In the embodiment shown, the send screen 410 is a dynamic pop-up screen or window that enables the user to quickly and easily send Bio-Cards. Alternatively, the send screen 410 may appear as a separate screen, as part of the home screen 404, or be otherwise visually presented. Application 400 automatically detects recipient users that have a version of application 400 that enables a Bio-Card to be "Snapped", as described herein. If the recipient user has such a version of application 400 running, the send screen 410 allows the user to "Snap" a Bio-Card to the recipient. In the embodiment illustrated, Snapping sends a Bio-Card directly to the recipient's mobile device 415 simply by selecting the user as described above. When the user Snaps a Bio-Card to the recipient user, the application passes the Bio-Card and the user's ID (e.g., a SnapID) directly to the recipient's mobile device 415, e.g., as described herein. Application 400 instance running on the recipient's mobile device 415 may add the Bio-Card to the recipient's directory of Bio-Cards. If the recipient does not have the appropriate version of application 400 running, then the send screen pop-up will not be displayed. The user may then choose to send the Bio-Card by entering an ID, (e.g., a SnapID). If the recipient does not have any version of application 400 loaded on their mobile device 415, the user may send biographical information by entering a text or e-mail address. Application 400 will send a text or e-mail message with the biographical information. In an embodiment, application 400 sends the biographical information in a vCard file format when the recipient is not running application 400. In the event an intended recipient is not running application 400, the sender can still use application 400 to transmit an e-mail or text message that is automatically embedded with a vCard attachment representing only that data that is contained on the Bio-Card version that the sender selects. Such an e-mail or text message may also include link to enable recipient to download and install application 400. In this way, the user can still use the system and method to instantly transmit contact information regardless of whether the recipient has application 400 running or not.

With continuing reference to FIG. 4, the map also shows server 420. The server 420 may store information regarding users that have application 400 loaded on their mobile device 415. The server 420 may enable a user-triggered update process. In the "server-less" send method, where user A transmitted a Bio-Card to user B directly using some variety of direct client to client networking (e.g., bonjour), the server 420 may employ a process whereby the server 420 routinely "polls" clients (the application running on mobile devices) to check for Bio-Cards not routed via the server. In another embodiment, the clients routinely push updates to the server 420 instead of being polled. In the server-less send method shown in FIG. 4, the server 420 is notified via some method that a Bio-Card has been transmitted and stored without the server's 420 knowledge or involvement. After notification, the server 420 may then, in turn, make a record of that Bio-Card so that the server 420 database (not shown) is in sync with whatever Bio-Cards a particular user holds on application-enabled mobile device. This serves to keep the integrity of the data on server 420 whole and will allow a user a dependable "refresh" should they lose or upgrade their mobile device and need to pull down all their collected Bio-Cards using their unique ID (e.g., using a SnapID and a password).

Figure 5:
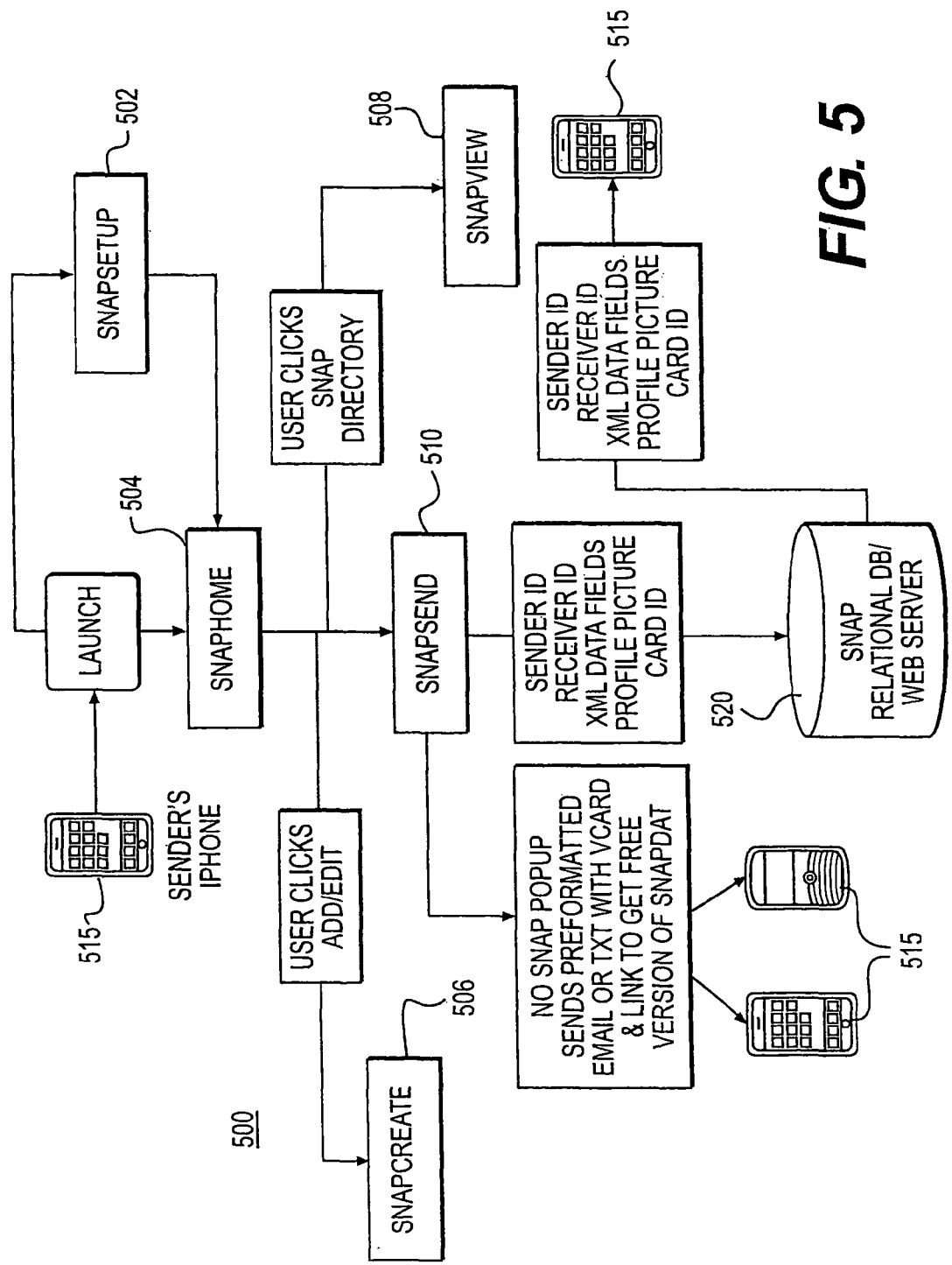
FIG. 5 is a diagram illustrating screens of an embodiment of an application for sharing biographical information provided by embodiments of a method and system for sharing and storing digital information in mobile devices.

With reference now to FIG. 5, shown is another screen map illustrating screens of application 500 of an embodiment of the system and method. In the embodiment shown, the user may snap Bio-Cards to other application users from the send screen 510 by entering the recipient's ID (e.g., SnapID). In an embodiment, the user enters the recipients ID (e.g., SnapID) and selects send and, in response, application 500 sends the sender ID (e.g., the user's SnapID), the receiver ID (e.g., recipients SnapID), data fields and tags (XML data fields), a photo of the user (profile picture) and ID number for the user's BioCard (Card ID) to a system web and database server 520 (the process shown here may also be performed in a direct M2M implementation). It is noted that the data sent may omit some of the data listed here, may include different data or may include additional data. For example, in an embodiment in which the user generates or otherwise obtains graphics, photos, videos, sound, etc. for a completely unique Bio-Card layout and background, not using layouts, templates or graphics provided by the application, the user's unique graphics, etc., or a link (e.g., a URL) thereto, may also be stored in server 520 and be sent via server 520. In the embodiment shown, the web server 520 looks up routing information, in its database, for the recipient using the recipient's SnapID. The web server 520 may also maintain a table structure in the relational database of the user's biographical information, photos and his received and/or sent Bio-Cards. Accordingly, instead of sending photo and biographical information, user application 500 instance may send tags corresponding to these which server 520 will use to retrieve photo and biographical information from database and forward these to recipient. Likewise, when the user sends a Bio-Card, the web-server 520 may create an association in the table structure for the user (and/or the recipient) using the user's SnapID. If the user ever loses his mobile device 515, the user may load the application on his new mobile device and upload the Bio-Cards stored there for the user. In an embodiment, the server 520 stores the Bio-Card associated with the recipient's SnapID only if the recipient chooses to save the Bio-Card. The recipient may choose to save the received Bio-Card, delete the received Bio-Card, and/or save the received Bio-Card and Snap the user back.

The data fields and tags (e.g., XML or other format data fields) sent by the user's application 500 instance provide the user's selected biographical information and correspond to the graphics of the user Bio-Card. Rather then send the graphics themselves, the system and method includes tags corresponding to the graphics. The server 520 receives and forwards the data fields and tags (e.g., XML and other) to the recipient's mobile device 515. Likewise, the server 520 forwards the other data sent by application 500 running on user's mobile device, including card ID and user's photo (or retrieves and sends this data as described above).

The recipient's application 500 instance recreates the user's Bio-Card, loading the graphics identified by the tags (or downloading from other location if user-obtained content). In an embodiment, the graphics are stored by application 500 on the mobile device 515. As a result, in most instances the graphics are not transmitted over the pipe; instead, only the tags are sent. Similarly, instead of transmitting a layout, the sent card ID identifies a layout for the Bio-Card. Application 500 may have a number of pre-defined layouts, stored on the application-enabled mobile device 515, which the system may allow the user to select from. Application 500 on the recipient's mobile device 515 retrieves the pre-defined layout and graphics, identified by the card ID and tags, populates the identified layout with the sent biographical information, the graphics and the profile picture. As noted above, users may generate their own Bio-Card background and layout. In such instances, the user-generated or otherwise obtained content, or links thereto, will be sent and received by recipient's mobile device 515 instead of tags referencing graphics. If a link is sent, the recipient's mobile device 515 will access link and retrieved linked content. Application 500 may provide recipient with option to not retrieve user-obtained content.

Figure 6:
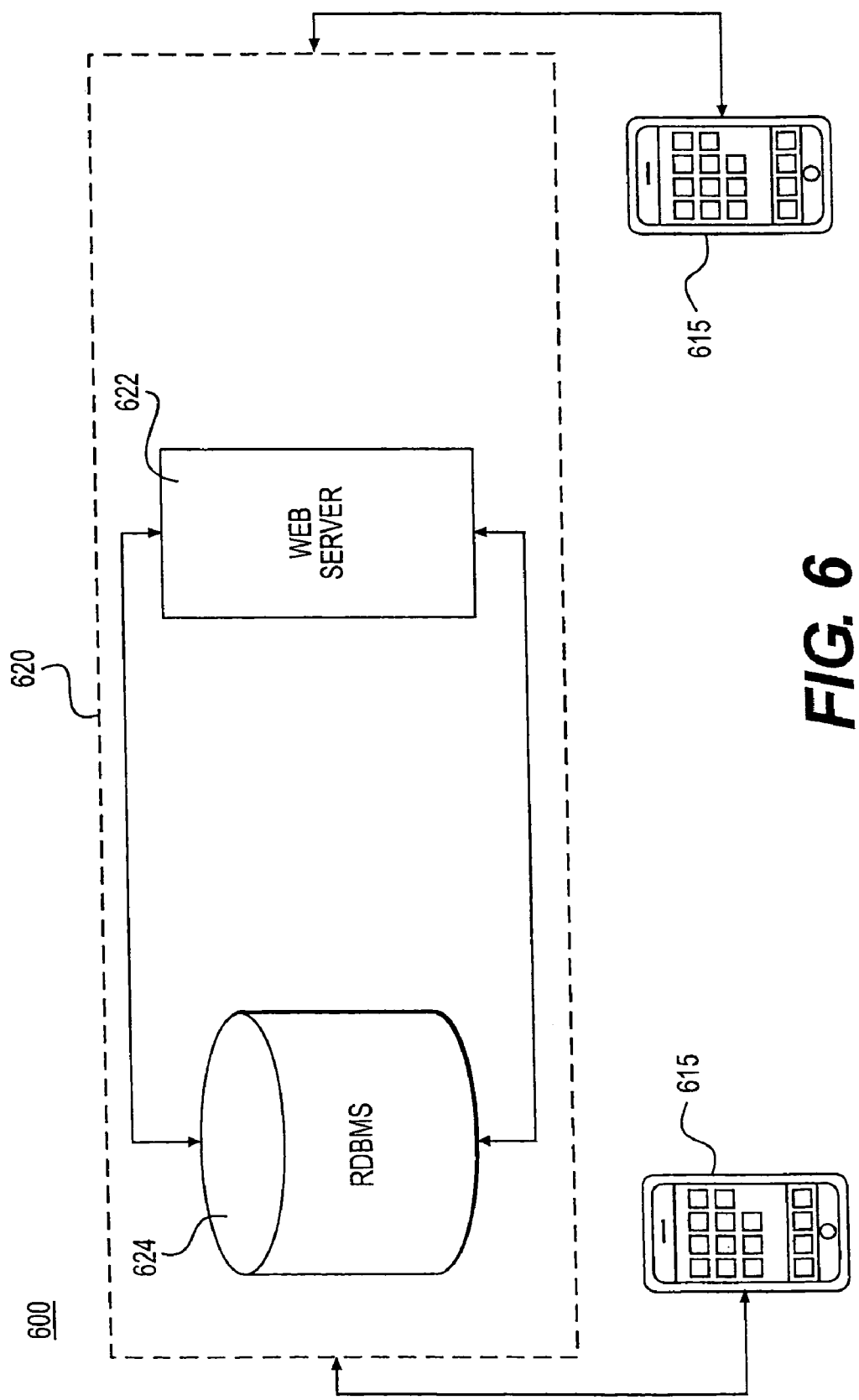
FIG. 6 is a block diagram illustrating an embodiment of a system for sharing and storing digital information (e.g., bio-data) in mobile devices.

With reference now to FIG. 6, shown is an illustration of an exemplary architecture of system 600. Shown are two mobile devices 615 on which the application is loaded and running. The mobile devices 615 are connected to a network (not shown), e.g., mobile telecommunication network and the Internet, and through the network to the system web server and database. The mobile devices 615 shown here are iPhones™. System 600 herein may work with iPhones or any other mobile device, preferably mobile devices with similar capabilities such as a BlackBerry™ device. As shown and discussed herein, server 620 serves and receives data fields and tags (e.g., XML strings and data) corresponding to the biographical or other digital information and the graphics of the card, SnapIDs, CardIDs and profile pictures. The web server 622 accesses the database(s) 624 to lookup information and store data as described above. The database(s) 624 may also provide logic for dynamic updating of user Bio-Card content described herein (e.g., polling of user's Bio-Card data and received Bio-Card data described above). In one embodiment, the database 624 is managed by a relational database management system (RDBMS)

Figure 7:
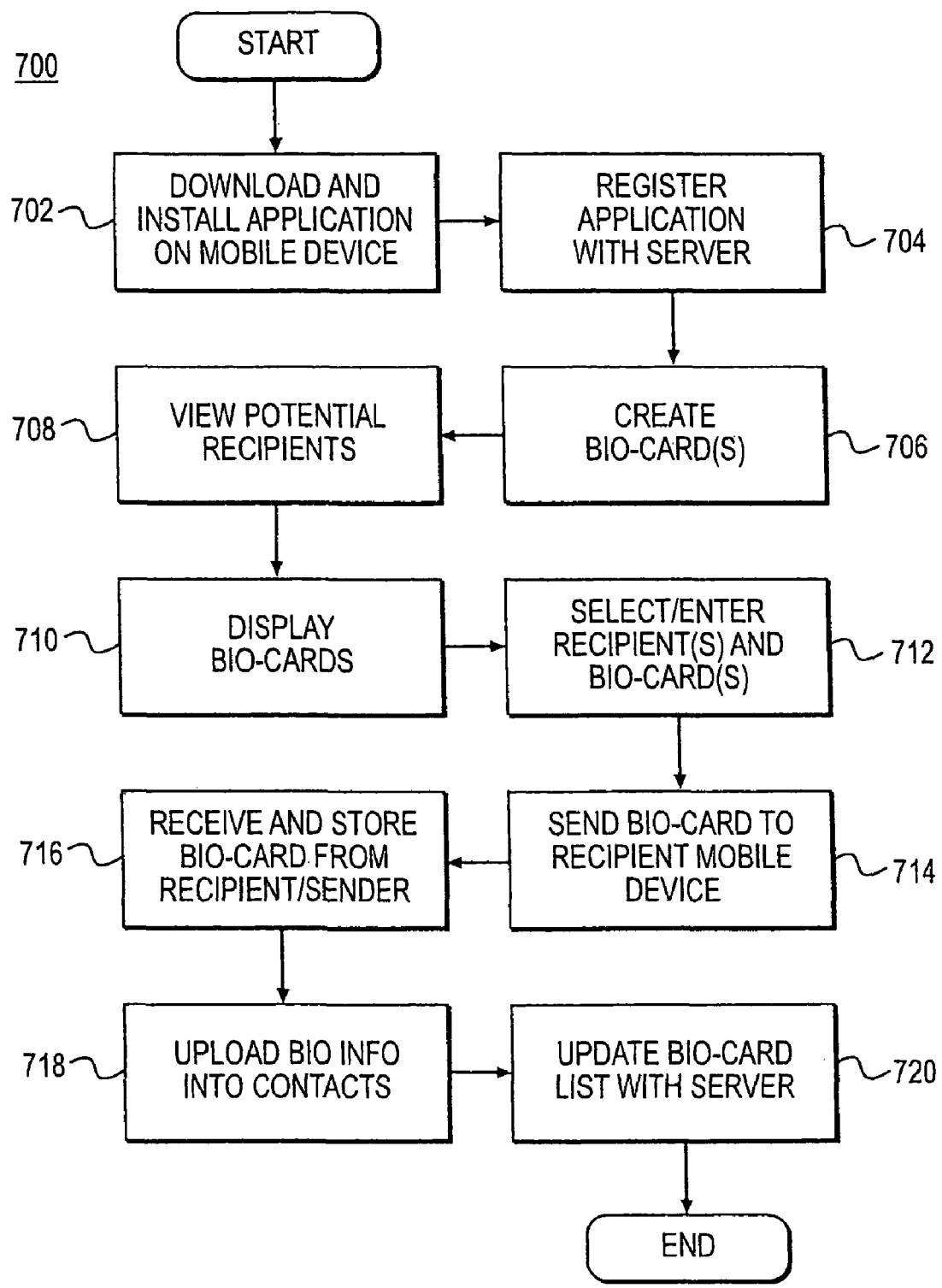
FIG. 7 is a flowchart illustrating an embodiment of a method for sharing and storing digital information (e.g., bio-data) in mobile devices.

With reference now to FIG. 7, shown is a flowchart of an embodiment of method 700 for sharing and storing digital information. Method 700 is illustrative and by no means exhaustive of the steps performed by systems and methods described herein. A user downloads and installs the application on their mobile device, block 702. The user may access a website or application store ("app store") to obtain the application. Once installed, the application registers with a system server, block 704. The server maintains a record of the user's received Bio-Cards so that the user can recover from loss of data, etc. The user uses the application to create a Bio-Card or Bio-Cards, block 706. For example, the user may select a card layout (identified by a unique card ID) and graphics for the Bio-Card. The user may select which biographical data is included in the Bio-Card. The user may also select a photograph for the Bio-Card, or the photograph may have been included in the set-up biographical information input by a user. The user may have different Bio-Cards for different purposes, as described herein. For example the user may select a more professional layout, photograph and/or graphics and only professional biographical information for a business-related Bio-Card, while using more personal information, less professional layouts, photographs and/or graphics for a social Bio-Card. The application stores created Bio-Cards on the user's mobile device. For example, the application may save the card ID, tags corresponding to the graphics and data fields with the selected biographical information on the user's mobile device.

If the user wants to share biographical information (or other information), the application may display potential recipients (e.g., via the always-on technology described above), block 708. The display may simply be a list and/or photos of the potential recipients, e.g., using the view screen described with reference to FIGS. 4 and 5 above.

The application displays the user's Bio-Cards (or other information to be sent), block 710, e.g., using the home screen described with reference to FIGS. 4 and 5 above. The user uses the application to select recipient(s) and the Bio-Card(s) to send, block 712. If the application displays potential recipients, the user may simply select a recipient(s) from the displayed potential recipients. Alternatively, the recipient may be selected by the user entering the recipients ID (e.g., a SnapID). The application sends the Bio-Card(s) to the recipient's mobile device (e.g., the user selects send option), block 714. The application may send the Bio-Card by transmitting various data directly to the recipient's mobile device or via a server, as described herein. The data may include the user's selected bio-data data fields, identifiers (e.g., card ID) and tags indicating the layout and graphics of the Bio-Card, and a link(s) to dynamically changing content (DynaData). If the recipient accepts Bio-Card the application on recipient's mobile device may receive the Bio-Card, display and store the Bio-Card, block 716. The recipient's application instance may display Bio-Card by retrieving the layout and graphics, using the card ID and tags, and populating with user's bio-data. It is noted that the user may choose not to store received Bio-Cards. The biographical information from the Bio-Card may be stored in the user's mobile device contacts, block 718. If recipient, or other user, transmits a Bio-Card back to user, user's application instance may repeat the preceding steps. At some point, either through polling or the application pushing the information, the server's lists of the user's received and saved Bio-Cards is updated, block 720. The server may also update user's Bio-Cards if stored by server. For example, the application may send the card IDs, tags (corresponding to graphics), data fields with selected biographical information and photographs for the user's Bio-Cards to the server.

As mentioned above, the system and method may digitally zone the Bio-Card. The digital zoning allocates Bio-Card "real estate", including space specifically for dynamically pushed content ("DynaData elements"). The digital zones may include a static zone, in which the information rarely if ever changes, a slowly-changing zone, in which the information changes infrequently, and a dynamic zone, in which the information is constantly and dynamically updated to provide relevant, timely information. An implementation of this embodiment refers to the dynamic zone as "DynaData" and it may include dynamically served multimedia content such videos, audio and slide-shows.

The dynamically served and updated content may include marketing messages, product launches, coupons, etc. For example, if a user is working for a retail business, his Bio-Cards may include a dynamic zone containing the business's current marketing message. When creating a Bio-Card, the user may define a dynamic zone on the Bio-Card and link multimedia content to the dynamic zone. The multimedia content may be stored or referenced (e.g., a URL) in the relational database table. The content may be updated by loading new content in the database, changing the reference in the database or by changing the content pointed to by the reference in the database. Whenever someone views the user's Bio-Card with the DynaData, the application may direct the server to access the relational database to retrieve the current DynaData (e.g., multimedia content) and push the DynaData (e.g., multimedia content) to the viewing mobile device. Alternatively, the application may retrieve the DynaData using a URL provided with the Bio-Card information (e.g., in the data fields).

Figure 8:
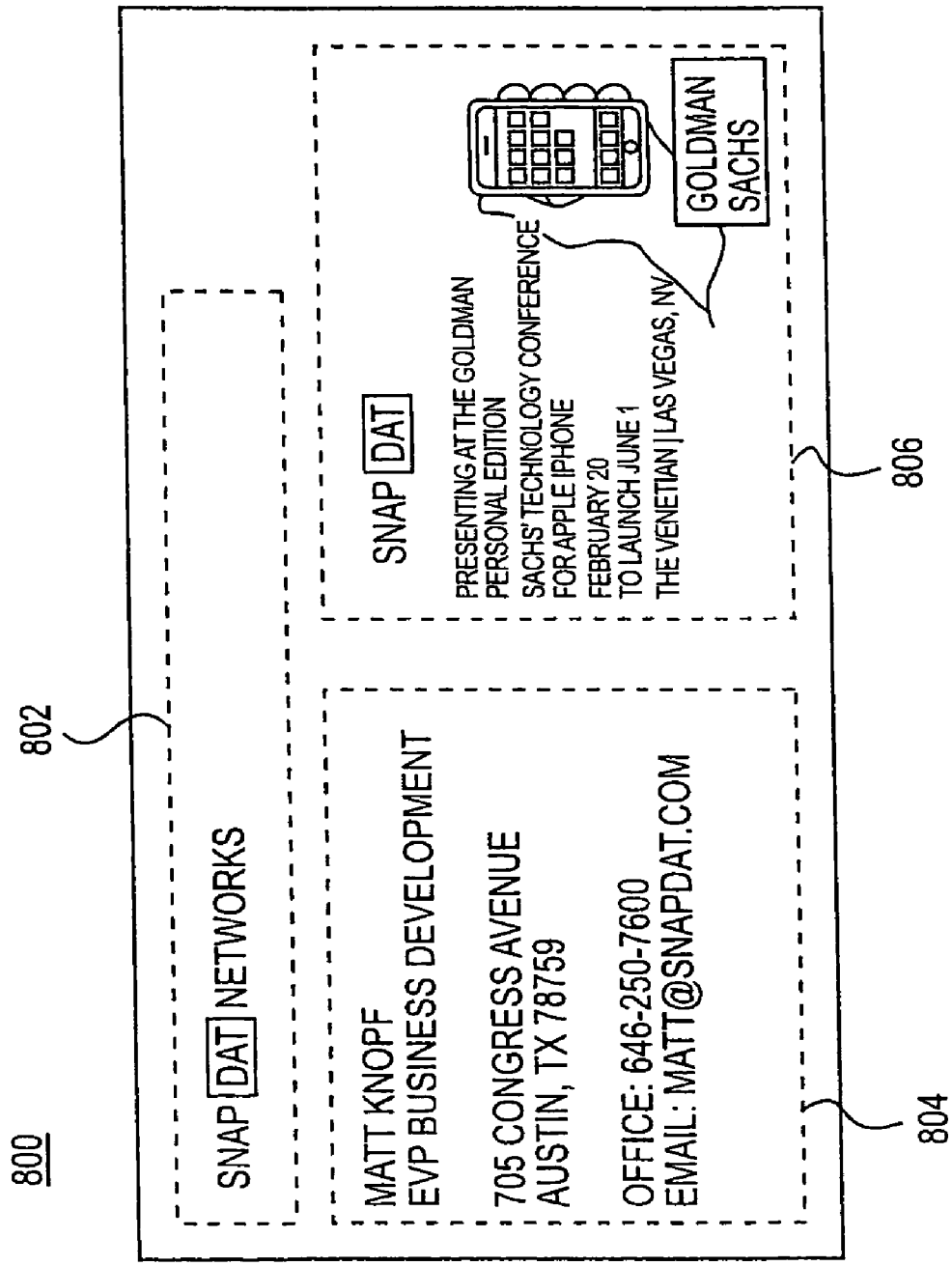
FIG. 8 is a drawing an embodiment of a graphical interface for sharing biographical information, or a Bio-card, provided by embodiments of a method and system for sharing and storing digital information in mobile devices.

With reference now to FIG. 8, shown is an exemplary Bio-Card 800 incorporating the digital zoning feature. The Bio-Card 800 shown includes a static zone 802 for data that rarely changes, such as company name, logo and tagline. Also shown is a slowly changing zone 804 for data that periodically changes include title, division, location, phone number etc. The dynamic zone 806 includes dynamically changing and updated data, DynaData, which can be created on demand, e.g., to coincide with a company's current marketing efforts (e.g., a new product launch). As described above, DynaData may be stored in system server database and referenced in a data field sent to recipient when Bio-Card is sent. Alternatively, DynaData may be stored at another server or other location and referenced in a link provided in a data field. The DynaData stored on the server is constantly updated to keep it up-to-date. In this manner, the user does not have to worry about updating the dynamic data field on the user's Bio-Card, since the server will contain the updated DynaData. When recipient receives Bio-Card, application on recipient mobile device may retrieve DynaData from system server or from other location using reference in data field.

As mentioned above, an embodiment of the system and method utilizes the unique, graphical, biographical information based interface to provide a graphics-rich, contact-based, dynamic, mobile digital marketplace. The mobile digital marketplace instantly matches people with products, services or virtually any digital asset, as described below. Such a digital marketplace enables users to, e.g., choose recipient(s), a product/service/digital file (e.g., a coupon or certificate, a purchase voucher, a photo, resume, etc.), send instantly to the recipient, who receives it instantly and may redeem it instantly to acquire the product or service. Embodiments may allow a user to GROUP recipients into natural groupings (colleagues, reports, friends, etc.) so that the user may select multiple recipients at once to share a digital product/service/file. All of this may be done M2M.

Figure 9:
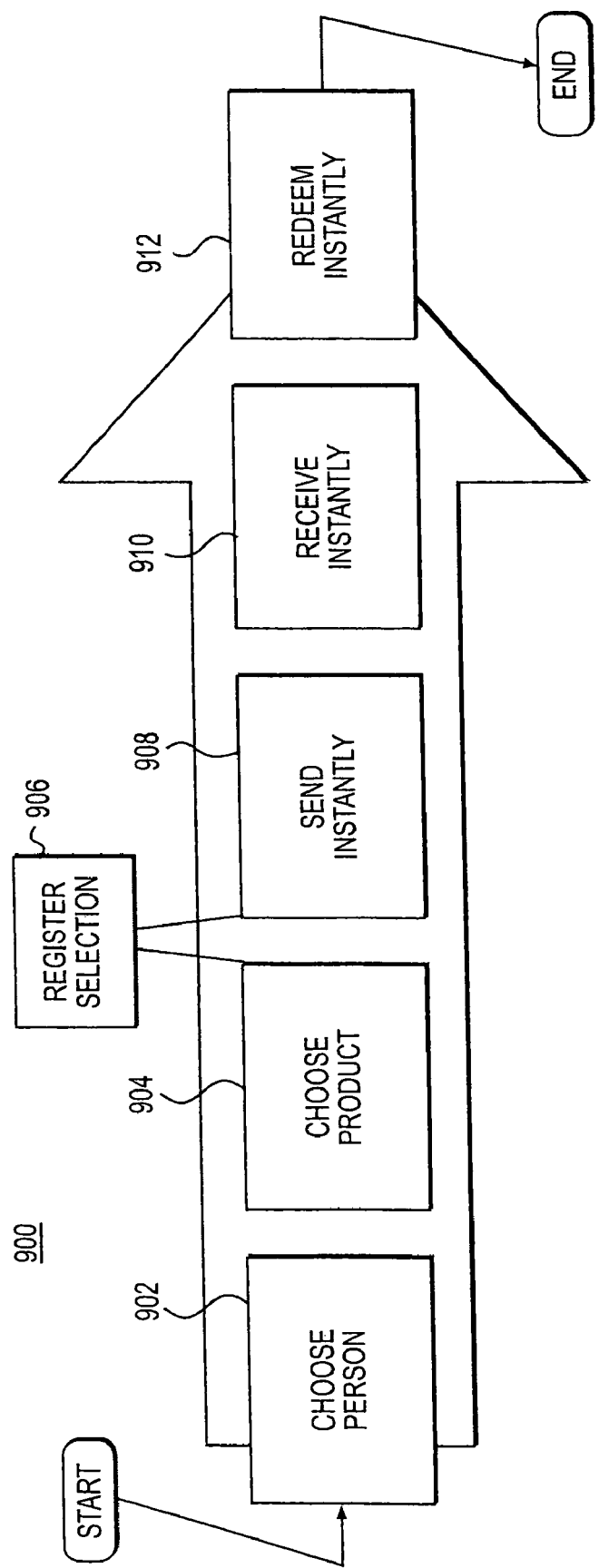
FIG. 9 is a flowchart illustrating an embodiment of a method for sharing electronic gifts provided by provided by embodiments of a method and system for sharing and storing digital information in mobile devices.

With reference to FIG. 9, shown is an exemplary flowchart of method 900 of sending gifts from mobile device to mobile device utilizing embodiments of system and method described herein for sharing and storing digital information in mobile devices. A user with the application installed on their mobile device may select a recipient(s) (e.g., on the view screen), block 902. The user may then access a product or service selection screen, e.g., a gift selection screen provided by the application or a web page accessed through the user's mobile device. The user chooses a product or service (the "gift" or "Snap Goody"), block 904. The gift may be any product or service, or a digital voucher therefore, that the user wishes to give to the recipient. Alternatively, the gift may be a digital coupon or gift certificate for a certain amount that may be used towards the product or service or at a particular vendor (e.g., service provider or retail establishment) for any good or service offered. When the user selects the gift, the user's selection may be registered with the appropriate vendor or, e.g., a clearing-house that enables recipient to redeem the gift, block 906. The registration may associate a particular code or ID (a gift code) with the gift that may be used by a vendor to verify and redeem the gift. The retail establishment may be "brick and mortar" or online.

After selecting the gift and the recipient (or recipients), the user may send the gift to the recipient, block 908. The gift may be sent in the same manner as described above for sending Bio-Cards. For example, a gift file corresponding to and describing the gift may be included in a data field described above. Alternatively, the application may have pre-determined gift templates (e.g., a Starbucks™ gift certificate), including the gift layout and graphics, that may be referenced by a product ID and/or tags. In this example, the application sends a gift by sending a sender ID, recipient ID, a product ID and data fields with the gift specifics (e.g., amount of the gift certificate if not specified by product ID and a gift code), in a manner similar to that described above for sending card IDs and tags for Bio-Cards. If the recipient has the application installed on their mobile device, the recipient may instantly receive, block 910, and redeem the gift, block 912. The recipient's application may receive the gift by opening the gift file or retrieving the gift template with the product ID (and populating the gift template with the gift specifics if necessary). The recipient may redeem the gift by presenting the gift to a vendor. The recipient may present the gift, e.g., by sending the received gift file or transmitting the populated gift template or simply the gift specifics to the vendor. The gift may be received by the vendor in a M2M manner or via system server. If the recipient does not have the application installed, the recipient may receive a text or e-mail message on their mobile device. The message may include a link to enable them to download and install the application.

The gifts may be instantly sent to any recipient using the system and method. Consumers may send gifts as gifts to friends and family. Businesses may send gifts as a marketing tool or as away to reward loyal customers or employees. The gifting method described above is far more efficient and convenient then today's way of giving gifts. Today, a user would have to go to a store, buy a gift card and mail or hand-deliver the gift card. Alternatively, a user could go to a website, enter the user's information (to register), enter the recipients e-mail or address, select the gift, e-mail or send a link for the gift. Then the recipient would have to open the message, open the link, print out the gift, remember to bring the gift and go present the printout at the store.

Figure 10B:
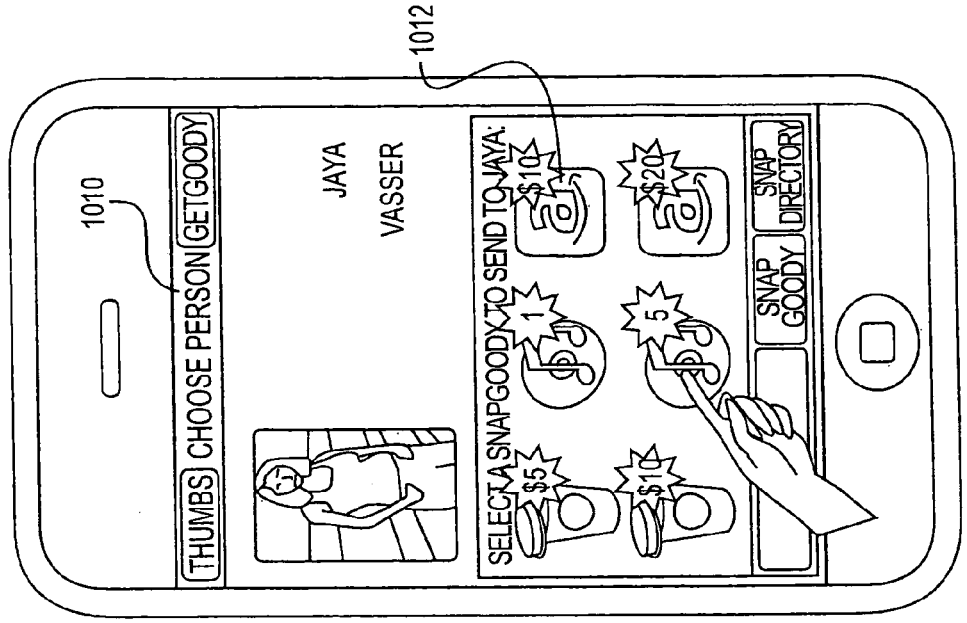
FIGS. 10A-10B are drawings illustrating embodiments of graphical user interfaces for sharing electronic gifts provided by provided by embodiments of a method and system for sharing and storing digital information in mobile devices.
Figure 10A:
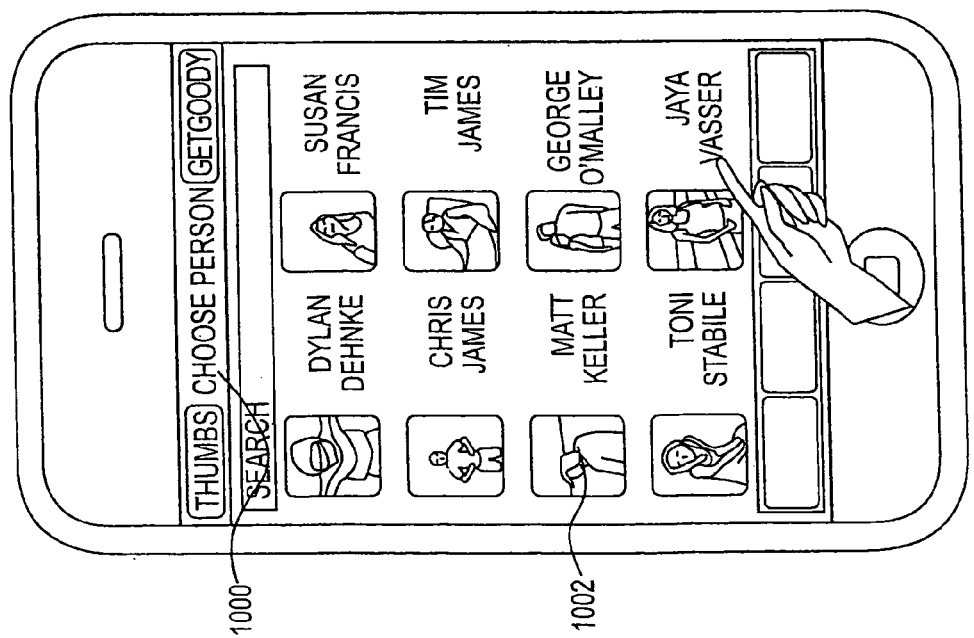

With reference now to FIGS. 10A-10B, the system and method herein provide a much simpler and quicker process. Using the Bio-Cards and their information, the user may quickly transmit, (e.g., "Snap") a recipient a gift. As shown in FIG. 10A, an exemplary view screen 1000, the user may select a recipient(s) from a displayed list of the user's stored Bio-Cards 1002. As shown in FIG. 10B, an exemplary gift selection screen 1010, the user may select the gift(s) 1012 to send to the selected recipient(s). Since no one typically leaves home without their mobile device, the recipient will generally always instantly receive their gift 1012 and be able to redeem their gift 1012 immediately. If recipients share their birthday, anniversary, etc. information in their Bio-Cards, the application may be set-up to remember these key dates and remind the user when they occur. The reminders may include suggested gifts or links to vendors (e.g., targeted to the recipient based on their biographical information or because of fees paid by the vendors to have their products or services suggested.

In an embodiment, each vendor is assigned a unique vendor code or ID. Likewise, each product or service may have a unique product ID assigned to it. For example, a Starbucks $10 item or gift certificate may each have their own product ID. Graphics corresponding to the vendor may be stored locally on the mobile device so that the graphics do not have to be transmitted through the pipe. When a user sends a gift, the application may send a sender ID (e.g., SnapID), recipient ID (e.g., SnapID), a vendor ID and a product ID. In an embodiment, the system server processes payment via a third-party credit card clearing house, or through a vendor's own payment processing system (e.g., iTunes) and confirms the purchase. In an embodiment, the gift purchase price may include a percentage for the system owner to process the order. The remaining balance may be delivered to the vendor.

After confirming the purchase, the server may receive a unique, validated gift code from the vendor. The gift code is preferably associated with the gift. The server provides the vendor with the recipient information so that the recipient may redeem the gift. Once everything is validated as described herein, the server transmits the required data, such as, but not limited to, the gift code, vendor ID, product ID, sender ID (e.g., SnapID), compliance fields, SSL, etc., to the recipient. The gift may be represented by XML data fields that include text and references to graphic information that will be displayed by recipient's mobile device as described above for Bio-Cards.

The recipient may redeem the gift by verbally communicating the gift code from the gift displayed on their mobile device, having the gift include a display of system-readable code, such as a semacode or a bar code that will be read by the vendor's system, via transmission of the gift to the vendor's own instance of the application, which may be integrated with the vendor's point-of-sale system (e.g., running on registers and other checkout devices), or via a directly redeemable link to vendor's online stores (e.g., iTunes) in which recipient simply enters or to which recipient transmit the gift code. As with the Bio-Cards, the system and method herein provide a simple and easy to use select person, select gift and send mechanism for sending digital gifts.

In another embodiment, the method and system described herein may also provide software-integrated mobile advertising. In an embodiment, the software-integrated mobile advertising provides a new way to advertise or communicate a brand that is not random or obtrusive. The embodiment described herein offers contextual branding opportunities that tightly integrate and leverage the natural "processing" pauses and user interface functions within the application, or other mobile device applications.

Client/server or web applications often have pronounced and generally "user-tolerated" pauses while content is uploaded or downloaded from a server, CPU calculations, etc. This timing is more pronounced in the mobile experience due to less through-put on wireless networks. Typically a graphic such as a growing status bar or spinning hourglass is presented to indicate to the user that a process is taking place. The embodiments described herein use this dead time advantageously—offering a branded experience integrated directly into a functional visual element of the application (e.g., status bar or spinning hourglass), consequently minimizing the obtrusiveness of the overall ad experience.

Example 1

During the natural time pause involved in receiving a "served" up Bio-Card, the application displays a spinning logo as opposed to the generic hourglass. For example, the spinning logo may be, e.g., the Nike Swoosh or the Starbucks logo.

Example 2

During the time involved in transmitting data, the application displays a branded process as opposed to the generic growing status bar. For example, the application may display a glass vertically filling up with Coca-Cola or a runner sprinting across a horizontal track for Nike.

Basic Methodology: the ads would either be resident and installed during the initial download install of the application. Alternatively, the system and method would retain the ability to serve down branded ads transparently to the user and store them locally on the mobile device.

For each "session" that a user enters the application, the application will select and display the appropriate set of "branded" user interface elements (spinners, status bars, placement ads, etc.). The group of branded elements may continue to be presented throughout the time that session is active. For each unique session, the branded elements would correspond to, e.g., one vendor. Upon launching a new session, the application would cycle to the next set of branded elements for another vendor, e.g., the Coca Cola Spinning Logo (to replace the hourglass) and the filling glass animation (to replace the growing status bar).

The system and method may also use the space within the view screen, or other screen where Bio-Cards are received in the application, to allow advertisers to present more expansive banner-like advertising that correspond with their "branded" integrated functional elements. These larger ads will, e.g., only be displayed while the user has to wait the few seconds anyway to receive a card.

Ideally, each vendor will have and display their own ID (e.g., SnapID) within the context of the ad—where they can invite the user to "Snap" the company their card in exchange for something of value—say, a giveaway or discount code, etc. The system and method may also provide a "delayed" clickable event within an advertisement, such that when a user clicks on an advertisement, the browser within the mobile device will transport the user to that website only AFTER the user finishes his/her session within the application.

With reference now to FIG. 11, shown is an embodiment of method 1100 of sending a Bio-Card using embodiments of the system and method for sharing and storing information in mobile devices. In method 1100, user's mobile device has application installed and running. Application detects potential recipients, block 1102. User selects a recipient or multiple recipients, block 1104. Application enables a user to select more than one recipient at a time. This may be particularly useful for a business user targeting multiple potential customers at one time. User selects a Bio-Card, or other digital information, to send, block 1106. Bio-Card is zoned, and includes static data, slowly-changing data and DynaData. In the embodiment shown, user wants to entice recipients to accept user's Bio-Card, provide recipients' Bio-Card and/or to do business with user. Accordingly, user also selects a gift to send, block 1108. Selection of gift causes application to register gift and obtain gift code, block 1110.

In response to user instructions, application sends Bio-Card and gift. In embodiment shown, application transmits sender ID, recipient ID(s), data fields containing bio-data, gift code and product ID (corresponding to gift), and link to DynaData, card ID, and tags for graphics or graphics file/link for user-obtained graphics, block 1112. If sent via server, the server receives the sent data, retrieves necessary data from database, block 1114, and forwards received and retrieved data, if any, to recipient mobile device, block 1116. Server may retrieve 1114, e.g., recipients' mobile device numbers by looking up using recipient IDs; Server may also retrieve 1114 DynaData and user obtained graphics. Recipient's application receives the data, block 1118. If recipient accepts Bio-Card, recipient's application displays Bio-Card, block 1120, retrieving layout and graphics and populating with bio-data, including DynaData (e.g., received from server or directly obtained by recipient's application. Recipient's application stores bio-data, card ID and necessary tags for later retrieval and display, block 1122. Indeed, recipient may skip display 1120 and simply store Bio-Card 1122. Recipient's application may also display gift, block 1124, retrieving layout and graphics using product ID and redeem gift, block 1126, sending gift code to vendor. Alternatively, recipient's application may store gift for later redemption, not shown, saving product ID and gift code. User and/or recipient Bio-Card information, both sent and received Bio-Cards, may be updated and synchronized with system server, block 1128. This may include automatic polling by server and/or automatic or user-initiated pushing of necessary information to server by applications.

The terms and description user herein are set forth by way of illustration and are not meant as limitations. Those skilled in the art will recognize that many variations are possible within the spirit and scope of the embodiments described herein and defined in the following claims, and their equivalents, in which all terms are to be understood in their broadest possible sense unless otherwise indicated.

What is claimed is:

1. A method for sharing biographical information on mobile telecommunication devices, comprising
   providing an application for sharing bio-cards on a mobile telecommunication device, wherein the mobile telecommunication device includes a processor and a memory and bio-cards are digital representations of biographical information about a user that may be displayed on the mobile telecommunication device;
   receiving inputs including biographical information, one or more selected bio-card layouts and one or more bio-card graphics;
   creating one or more bio-cards based on the received inputs utilizing the processor;
   retrieving potential bio-card recipients, wherein the potential bio-card recipients include mobile telecommunication devices;
   displaying the created one or more bio-cards; receiving a selection of one or more recipients to receive a bio-card;
   receiving a selection of a bio-card to send to the selected one or more recipients; and
   transmitting the selected bio-card to the one or more selected recipients, wherein the transmitting the selected bio-card comprises:
      retrieving the biographical information, a card ID corresponding to the bio-card layout, a tag corresponding to the bio-card graphics, and a recipient ID; and
      sending a sender ID, the biographical information, card ID, tag and recipient ID, wherein the one or more selected recipients include stored bio-card layouts and bio-card graphics that are retrieved using the card ID and tag;
   a selected recipient receiving the sender ID, the biographical information, card ID and tag and recipient ID;
   the selected recipient retrieving the bio-card layout with the card ID and the bio-card graphics with the tag; and
   the selected recipient populating the layout with the biographical information and the graphics.

2. The method of claim 1 wherein the transmitting the selected bio-card sends the biographical information, card ID, tag and recipient ID over a telecommunication network.

3. The method of claim 2 wherein the transmitting the selected bio-card sends the biographical information, card ID, tag and recipient ID over a telecommunication network to a server.

4. The method of claim 3, wherein the transmitting the selected bio-card further sends user generated or user obtained information over the telecommunication network to the server, wherein the user generated and/or user obtained information include graphics, photos, videos and sound.

5. The method of claim 4, wherein the user generated and/or user obtained information is stored in the server.

6. The method of claim 3 further comprising:
   registering the application with the server;
   updating information corresponding to a sender on a server database based on the sender ID and the sent the biographical information, card ID, tag and recipient ID; and
   the server forwarding the biographical information, card ID, tag and recipient ID over a telecommunication network to the recipient mobile telecommunication device.

7. The method of claim 1 further comprising the server synchronizing the created one or more bio-cards with a sender entry in a server database.

8. The method of claim 1 further comprising determining if the selected recipient has a current version of the application running.

9. The method of claim 8 wherein if the selected recipient does not have a current version of the application running, the transmitting the selected bio-card sends the biographical information in a text to the recipient.

10. The method of claim 1 wherein the bio-card includes a photograph of a user.

11. The method of claim 1 wherein the bio-card includes dynamically updating data that is continuously updated, the transmitting the selected bio-card includes sending a data field corresponding to the dynamically updating data.

12. The method of claim 11, wherein the dynamically updating data is stored on the server and the method further comprises the server sending the dynamically updating data to the one or more selected recipients.

13. The method of claim 12, wherein the dynamically updating data is multimedia content.

14. The method of claim 1 wherein the retrieving potential bio-card recipients comprises the application connecting to other mobile telecommunication devices and determining whether the other mobile telecommunication devices are running the application.

15. The method of claim 1 wherein the transmitting the selected bio-card sends the biographical information, card ID, tag and recipient ID to the one or more selected recipients.

16. The method of claim 1 further comprising:
   receiving a gift selection for a selected recipient;
   registering the selected gift with a corresponding vendor;
   receiving a gift code from the corresponding vendor; and
   transmitting a product ID corresponding to the gift and the gift code to the selected recipient.

17. The method of claim 16 further comprising:
   the selected recipient receiving the product ID and the gift code;
   retrieving the gift using the product ID; and
   redeeming the gift, wherein redeeming the gift includes transmitting the gift code to the vendor.

18. A computer readable medium containing instructions for sharing biographical information on mobile telecommunication devices, by:
- receiving inputs including biographical information, one or more selected bio-card layouts and one or more bio-card graphics, wherein bio-cards are digital representations of biographical information about a user that may be displayed on the mobile telecommunication device;
- creating one or more bio-cards based on the received inputs utilizing a processor;
- retrieving potential bio-card recipients, wherein the potential bio-card recipients include mobile telecommunication devices;
- displaying the created one or more bio-cards;
- receiving a selection of one or more recipients to receive a bio-card;
- receiving a selection of a bio-card to send to the selected one or more recipients; and
- transmitting the selected bio-card to the one or more selected recipients, wherein the transmitting the selected bio-card comprises:
  - retrieving the biographical information, a card ID corresponding to the bio-card layout, a tag corresponding to the bio-card graphics, and a recipient ID; and
  - sending a sender ID, the biographical information, card ID, tag and recipient ID, wherein the one or more selected recipients include stored bio-card layouts and bio-card graphics that are retrieved using the card ID and tag;
- wherein, a selected recipient:
  - receives the sender ID, the biographical information, card ID and tag and recipient ID;
  - retrieves the bio-card layout with the card ID and the bio-card graphics with the tag; and
  - populates the layout with the biographical information and the graphics.

19. A system for sharing biographical information on mobile telecommunication devices, comprising:
- a server;
- a database associated with the server; and
- a mobile telecommunications device, connected to the server via a telecommunications network, the mobile telecommunication device including a processor and a memory, the memory including instructions, executed by the processor, for sharing bio-cards, wherein the bio-cards are digital representations of biographical information about a user that may be displayed on the mobile telecommunication device, the instructions including instructions for:
  - receiving inputs including biographical information, one or more selected bio-card layouts and one or more bio-card graphics;
  - creating one or more bio-cards based on the received inputs utilizing the processor;
  - retrieving potential bio-card recipients, wherein the potential bio-card recipients include mobile telecommunication devices;
  - displaying the created one or more bio-cards;
  - receiving a selection of one or more recipients to receive a bio-card;
  - receiving a selection of a bio-card to send to the selected one or more recipients; and
  - transmitting the selected bio-card to the one or more selected recipients, wherein the transmitting the selected bio-card comprises:
    - retrieving the biographical information, a card ID corresponding to the bio-card layout, a tag corresponding to the bio-card graphics, and a recipient ID; and
    - sending a sender ID, the biographical information, card ID, tag and recipient ID, wherein the one or more selected recipients include stored bio-card layouts and bio-card graphics that are retrieved using the card ID and tag;
- a selected recipient, wherein the selected recipient:
  - receives the sender ID, the biographical information, card ID and tag and recipient ID;
  - retrieves the bio-card layout with the card ID and the bio-card graphics with the tag; and
  - populates the layout with the biographical information and the graphics.

\* \* \* \* \*